US010364919B2

(12) United States Patent
Borjesson et al.

(10) Patent No.: US 10,364,919 B2
(45) Date of Patent: Jul. 30, 2019

(54) MANUFACTURING PROCESS FOR MAKING A BRACKET AND TUBING ASSEMBLY

(71) Applicant: AUTOTUBE AKTIEBOLAG, Varberg (SE)

(72) Inventors: Jan Borjesson, Varberg (SE); Per Antonsson, Varberg (SE); Jan Olofsson, Varberg (SE); Viktor Rosen, Kallered (SE); Jan-Inge Hilmersson, Horred (SE)

(73) Assignee: AUTOTUBE AKTIEBOLAG, Varberg (SE)

( * ) Notice: Subject to any disclaimer, the term of this patent is extended or adjusted under 35 U.S.C. 154(b) by 58 days.

(21) Appl. No.: 15/468,723

(22) Filed: Mar. 24, 2017

(65) Prior Publication Data
US 2017/0276262 A1 Sep. 28, 2017

(30) Foreign Application Priority Data
Mar. 24, 2016 (FR) ...................................... 16/52529

(51) Int. Cl.
*F16L 3/12* (2006.01)
*B21D 39/02* (2006.01)
*F16L 3/02* (2006.01)
*F16L 55/035* (2006.01)

(52) U.S. Cl.
CPC ................ *F16L 3/12* (2013.01); *B21D 39/02* (2013.01); *F16L 3/02* (2013.01); *F16L 3/1218* (2013.01); *F16L 55/035* (2013.01)

(58) Field of Classification Search
CPC .......... F16L 3/12; F16L 55/035; B21D 39/02; B21D 39/06; B21D 53/36
See application file for complete search history.

(56) References Cited

U.S. PATENT DOCUMENTS

| 2,361,139 | A | * | 10/1944 | White | ..................... | B21D 53/36 |
| | | | | | | 156/223 |
| 2,371,138 | A | * | 3/1945 | Harrison et al. | ....... | B21D 53/36 |
| | | | | | | 72/307 |
| 2,404,110 | A | * | 7/1946 | Trafton | ...................... | F16L 3/12 |
| | | | | | | 24/19 |
| 3,061,253 | A | * | 10/1962 | Keaton | ................. | F16L 3/1075 |
| | | | | | | 248/74.1 |

(Continued)

FOREIGN PATENT DOCUMENTS

DE 3804996 A1 8/1989

*Primary Examiner* — Bradley Duckworth
(74) *Attorney, Agent, or Firm* — Oliff PLC (57) ABSTRACT

Invention relates to a manufacturing process for making a bracket and subset assembly, process including: step (a) of placing bracket within a forming tool and putting between first portion of said bracket and second portion of said bracket a subset having a tube element and an elastic pad, step (b) of actuating the forming tool for plastically deforming the bracket so the first and second portions of the bracket come closer one to the other and press subset, thus gripping subset between the first and second portions of bracket, and during the step of actuating the forming tool for plastically deforming bracket, step (c) of using a propping spacer, distinct from the subset, for stopping the second portion of the bracket at a predetermined clamping distance from the first portion of the bracket, to secure the subset without crushing it.

15 Claims, 6 Drawing Sheets

(56) References Cited

U.S. PATENT DOCUMENTS

| | | | |
|---|---|---|---|
| 3,853,148 A | 12/1974 | De Vincent et al. | |
| 4,571,803 A * | 2/1986 | Chatfield | B21D 53/36 29/235 |
| 5,586,738 A * | 12/1996 | Binelli | F16L 3/1008 24/20 TT |
| 8,870,132 B2 * | 10/2014 | Sampson | F16L 3/123 248/62 |
| 9,482,369 B2 * | 11/2016 | Sampson | F16L 3/1058 |
| 9,895,738 B2 * | 2/2018 | Hattori | B21D 53/36 |
| 2008/0017761 A1 | 1/2008 | Hashimoto | |
| 2017/0030486 A1 * | 2/2017 | Sampson | F16L 3/1083 |

* cited by examiner

MANUFACTURING PROCESS FOR MAKING A BRACKET AND TUBING ASSEMBLY

The invention relates to a bracket and subset assembly, such as a bracket and tubing assembly, and a manufacturing process for making the same.

Bracket and tubing assemblies are widely used for fixing tubing elements, such as pipes, to various supports.

A well-known example of use consists in fixing a pipe to an engine or a chassis in a vehicle.

Usually, a bracket and tubing assembly comprises on the one hand a tubing subset, including a pipe portion surrounded by an elastomeric sleeve, and on the other hand a bracket made of a metal strip, which surrounds and grips the tubing subset.

Gripping the tubing subset within the bracket is usually achieved by pre-forming the bracket into a curved U-shape so as to create a substantially cylindrical recess located between two emerging branches, and then spreading said branches for inserting the tubing subset in the recess, and finally pressing and securing the branches one against the other, with additional fixation means such as a screw, a rivet, a folded tab, a welding bead or the like, so as to firmly clamp the tubing subset within the recess.

However, since additional fixation means are requested, the resulting bracket and tubing assemblies may disadvantageously be relatively costly and heavy.

In addition, the manufacturing process involves some restrictions in the bracket design, and is generally not suitable for full automation.

The invention consequently aims at remedying the above-mentioned drawbacks, and providing a new bracket and tubing assembly with a simplified design, suitable for automation, and a new manufacturing process for making such a bracket and tubing assembly at lower cost.

The objects of the invention are achieved by means of a manufacturing process for making a bracket and subset assembly, said process comprising:

a step (a) of placing a bracket within a forming tool and putting between a first portion of said bracket and a second portion of said bracket a subset comprising on the one hand at least a subset element, preferably a tube element, and on the other hand at least an elastic pad having a Young modulus that is lower than the Young modulus of the subset element, and which is interposed between said subset element and at least one of the first and second portions of the bracket, said subset having a first, initial thickness at rest, a step (b) of actuating the forming tool for plastically deforming the bracket so that the first and second portions of the bracket come closer one to the other and press the subset, thus compressing the thickness of the subset element and the elastic pad in a securing gap, and thus gripping said subset between the said first and second portions of the bracket, said process comprising, during the step (b) of actuating the forming tool for plastically deforming the bracket, a step (c) of stopping the second portion of the bracket at a predetermined distance from the first portion of the bracket, referred as "forced clamping distance", thus defining a first configuration of the securing gap, referred as "forced securing gap", wherein the subset has a second, reduced, intermediate thickness which is lower than the first, initial thickness, and a step (e) of releasing the bracket and subset assembly from the forming tool, wherein the plastically deformed bracket elastically relaxes so that the second portion of the bracket moves back at a distance from the first portion of the bracket, referred as "residual clamping distance", which is greater than the forced clamping distance, so that the securing gap adopts a second configuration referred as "residual securing gap", wherein the subset has a third, final thickness, which is greater than the second intermediate thickness, and wherein the forced clamping distance is chosen so that, within the residual securing gap resulting from releasing the bracket and subset assembly from the forming tool, the final thickness of the subset is lower than the first, initial thickness thereof, and the elastic pad is residually compressed in thickness, preferably of 1% to 40% in thickness, and more preferably of 1% to 15% in thickness, by comparison with said elastic pad's thickness at rest, so that the subset is secured in the residual securing gap by said first and second portions of bracket without the subset element being crushed by said first and second portions of bracket.

The objects of the invention are also achieved by means of a manufacturing process for making a bracket and subset assembly, said process comprising, as recited above, a step (a) of placing a bracket and a subset within a forming tool, a step (b) of actuating the forming tool for plastically deforming the bracket, a step (c) of stopping the second portion of the bracket at a predetermined distance from the first portion of the bracket, and a step (e) of releasing the bracket and subset assembly from the forming tool, wherein the step (c) of stopping the second portion of the bracket at a predetermined distance from the first portion of the bracket is achieved by means of a propping spacer, distinct from the subset, and the forced clamping distance is chosen so that, within the residual securing gap resulting from releasing the bracket and subset assembly from the forming tool, the final thickness of the subset is lower than the first, initial thickness thereof, and the elastic pad is residually compressed by comparison with said elastic pad's thickness at rest, so that the subset is secured in the residual securing gap by the first and second portions of bracket without the subset element being crushed by said first and second portions of bracket.

The objects of the invention are also achieved by means of a bracket and subset assembly comprising a bracket and a subset that is gripped in a securing gap formed by a first portion of said bracket and a second portion of the bracket which are plastically urged one toward the other, said subset comprising on the one hand at least a subset element, preferably a tube element, and on the other hand a least an elastic pad having a Young modulus that is lower than the Young modulus of the subset element, and which is interposed between said subset element and at least one of the first and second portions of the bracket, within the securing gap, and wherein the elastic pad is residually compressed of 1% to 40% in thickness, preferably of 1% to 15% in thickness, by comparison with said elastic pad's thickness at rest.

The objects of the invention are also achieved by means of a manufacturing process for making a bracket and subset assembly, and more particularly a bracket and tubing assembly, said process comprising:

a step (a) of placing a bracket within a forming tool and putting between a first portion of said bracket and a second portion of said bracket a subset, preferably a tubing subset, having at least a subset element, preferably at least a tube element, said subset preferably further comprising an elastic pad having a Young modulus that is lower than the Young modulus of the subset element, and which is interposed between said subset element and at least one of the first and second portions of the bracket, a step (b) of actuating the forming tool for plastically deforming the bracket so that the first and second portions of the bracket come closer one to the other and press the (tubing) subset, thus gripping said (tubing) subset between the said first and second portions of the bracket, during the step (b) of actuating the forming tool for plastically deforming the bracket, a step (c) of using a propping spacer, distinct from the (tubing) subset, for stopping the second portion of the bracket at a predetermined distance from the first portion of the bracket, referred as "forced clamping distance", thus defining a securing gap that separates the first portion of bracket from the second portion of bracket and wherein the (tubing) subset is secured by said first and second portions of bracket without being crushed by said first and second portions of bracket.

Advantageously, the invention makes it possible to produce a bracket and tubing assembly wherein the bracket is sufficiently bent plastically against the (tubing) subset for firmly holding said (tubing) subset, and more particularly the subset element (tube element), by means of the sole, intrinsic rigidity of said bracket.

More particularly, the elastic pad, which is preferably an elastomeric pad, such as an elastomeric sleeve surrounding the subset element (tube element), can advantageously accommodate, by elastic compression, the major part of the thickness shrinkage of the subset (tubing subset) within the securing gap, in particular in the forced securing gap, thus limiting the compression stresses in the subset element (tube element), notably during the step (b) of plastically deforming the bracket against the said subset (tubing subset).

Accordingly, said elastic pad makes it possible to have the first and/or second portion of the bracket "penetrate" the subset, when plastically deforming said bracket, while preventing the "fragile" subset element (tube element) from being excessively stressed and consequently from being damaged by crushing.

Thanks to an intrinsic wide range of elastic deformation, said elastic pad indeed makes a large deformation amplitude available for the first and/or second portion of the bracket, in an area initially occupied by the subset.

Accordingly, the first and/or second portion of the bracket can be deformed "in excess" against the subset by the forming tool, thus bringing the first portion sufficiently close to the second portion (for instance at the forced clamping distance) so that, despite the subsequent elastic relaxation (springback) of the bracket, and more particularly despite the springback of the second portion of the bracket which slightly brings the second portion of the bracket away from the first portion of the bracket, the resulting residual clamping distance due to the achieved plastic deformation of the bracket is lower than the thickness at rest of the subset, in a sufficient extent to have said subset being pressed and fixed within the corresponding residual securing gap.

It is noted that the elastic pad, which is softer than the subset element (tube element), accommodate the major part of the compression (thickness reduction) of the subset which is induced by deforming the bracket, both within the forced securing gap (i.e. when the first portion of the bracket is at the closest, forced, clamping distance from the second portion of the bracket) and within the residual securing gap (i.e. when the first portion of the bracket is back at the final, residual clamping distance of the second portion of the bracket), thus actively protecting said subset element from being damaged by compression between the first and second portions of bracket, in both configurations.

Advantageously, the bracket grips the (tubing) subset, thus preventing any unintentional removal of said (tubing) subset from said bracket, or any relative displacement of said (tubing) subset in rotation and translation, without it being necessary to further tighten the bracket into a closed loop around the (tubing) subset by additional fixation means such as screws or rivets (typically in joining the first portion and the second portion of the bracket together by means of such additional fixation means).

The resulting bracket and subset (tubing) assembly, which is obtained from a reduced set of simplified constituting parts, is thus of lighter and simpler design than the previously known assemblies.

In addition, securing the (tubing) subset within the bracket by suitably forming some bracket portions only requires simple bending operations, which can all be performed within a same forming tool, with no additional fixation means.

Consequently, the process according to the invention can be easily automated, and can thus achieve a high yield at low costs.

Further, using a propping spacer according to the invention makes it advantageously possible to strongly but accurately press the first portion of the bracket and the second portion of the bracket against the (tubing) subset, within the securing gap, thus fastening said (tubing) subset to the bracket, without damaging the said (tubing) subset, since said (tubing) subset is protected by said spacer from crushing, i.e. protected from excessive pressure and from any resulting excessive plastic deformation.

Said propping spacer automatically prevents breaking or cracking the tubing subset during the fastening operation, thus lowering the reject rate of the process, although no specific care is required when deforming the bracket around the tubing subset.

Again, this makes automation of the manufacturing process easier.

It is noted that the preferred combination of an elastic pad and a propping spacer achieves a very efficient protection of the subset element (tube element) while ensuring a very accurate and sufficient plastic deformation of the bracket, thus considerably enhancing the repeatability and liability of the process.

Other objects, features and advantages of the invention will be more apparent from the following detailed description, along with the accompanying drawings provided for illustrative and non limitative purpose, wherein.

The invention relates to a manufacturing process for making a bracket and subset assembly 1.

The bracket and subset assembly 1 comprises on the one hand a bracket 2, and on the other hand a subset 3 having at least a subset element 4.

The subset element 4 may be any kind of part, or combination of parts, of any shape or section (e.g. circular, rectangular, square . . . ), which are intended to be fastened to a receiving support (not shown), such as a chassis or an engine of a vehicle, via the bracket 2.

The subset element may thus comprise a massive bar or a plurality of massive bars.

The subset element 4 may preferably also comprise, or be constituted of, a hollow part, or a plurality of hollow parts, such as a tube element 4, or a plurality of tube elements.

Indeed, the process of the invention is particularly suitable for fastening fragile hollow elements, such as tube elements 4, which are possibly more subject to crushing than massive (full) parts.

Accordingly, the subset element 4 is preferably a tube element, and the assembly 1 is preferably a bracket and tubing assembly 1.

Consequently, for convenience, but with no restrictive purpose, one can preferably refer thereafter to a "tube element 4", a "tubing subset 3" and a "bracket and tubing assembly 1".

The tube element 4 may be a rigid pipe or a flexible hose, and can be made of any suitable material, such as plastic or metal.

Possibly, the tubing subset 3 may comprise a plurality of juxtaposed tube elements 4, e.g. arranged in parallel one to the other.

More globally, the subset element 4 may be a combination of one or more tube element(s) with one or more massive parts such as bar sections.

For convenience, the central axis of the tube element 4, and more globally the central axis of the (tubing) subset 3, is referred as Z-axis.

The bracket 2 comprises a supporting arm 5 arranged for supporting the tubing subset 3 and provided with one or more fastening interfaces 6, comprising for example one or more fastening holes 6 (as shown in FIGS. 1 to 4), and/or one or more fastening welded studs, etc., and which are intended for fastening, e.g. by a screwing, riveting or the like, said arm 5, and consequently the bracket and tubing assembly 1, to a support (not shown), such as a chassis or an engine of a vehicle, preferably a motor vehicle.

Preferably, the bracket and tubing assembly 1 is used for fixing in the vehicle a tube element 4 that constitutes a part of a fluid circuit, such as a cooling circuit, a braking circuit, a power-assisting circuit for a steering mechanism, a fuel supply circuit, an air supply circuit, a windscreen-washing circuit, etc.

Preferably, the subset 3 also comprises an elastic pad 7, said elastic pad 7 having a Young modulus that is lower than the Young modulus of the subset element 4, so as to be softer, and more subject to compressive elastic deformation than said subset element (tube element) 4.

Said elastic pad is preferably made of elastomeric material, such as rubber.

In a more preferred embodiment, the tubing subset 3 comprises an elastic pad forming a elastomeric sleeve 7, e.g. made of rubber, which surrounds the tube element 4.

Consequently, and for convenience, the elastic pad 7 will be preferably regarded as an elastomeric sleeve 7 thereafter.

Advantageously, such an elastomeric sleeve 7, and more globally such an elastic pad, damps noise and vibrations.

In addition, due to intrinsic elasticity, the elastic pad 7/elastomeric sleeve 7 may take up manufacturing tolerances when assembling the tubing subset 3 in the bracket 2, and thus ensure a better tight fixation.

As mentioned above, such an elastic pad 7/elastomeric sleeve 7 may also efficiently accommodate a plastic deformation of the bracket 2 against the subset 3 which is greater than the elastic springback of said bracket after releasing the assembly 1, thus making possible to have the bracket 2 firmly hold the subset 3 only by means of the final shape of said bracket 2 resulting from the plastic deformation thereof.

As shown in FIG. 3, 14, 19, 20, or 29, the elastomeric sleeve 7 may have the form of a split cylinder, with an inner surface mating the form of the subset element (tube element) 4, said inner surface being preferably substantially circular, and an outer surface of any suitable shape, preferably substantially rectangular or square.

The elastomeric sleeve 7 may also comprise one or more collars or shoulders 8, typically two collars 8 situated at a distance one from the other, said distance being substantially equal to the width of bracket's arm 5, so as to help in positioning the tubing subset 3 in the bracket 2 and to prevent undesired axial translation of said tubing subset 3 along the Z-axis with respect to said bracket 2.

As shown in FIGS. 5, 6, 8, 9, 22, 23 and 24, the manufacturing process of the invention comprises a step (a) of placing the bracket 2 within a forming tool 10.

Figure 3:
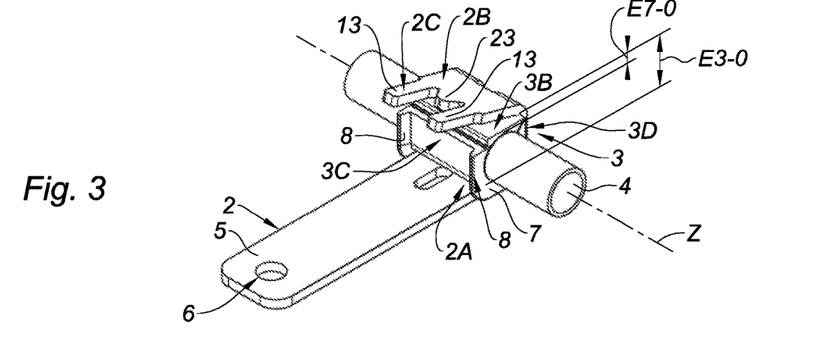
FIG. 3 is a perspective view of a pre-assembly comprising the bracket of FIG. 2 and a tubing subset received therein, between a first portion and a second portion of the bracket, prior to actuating the forming tool.
Figures 5, 7:
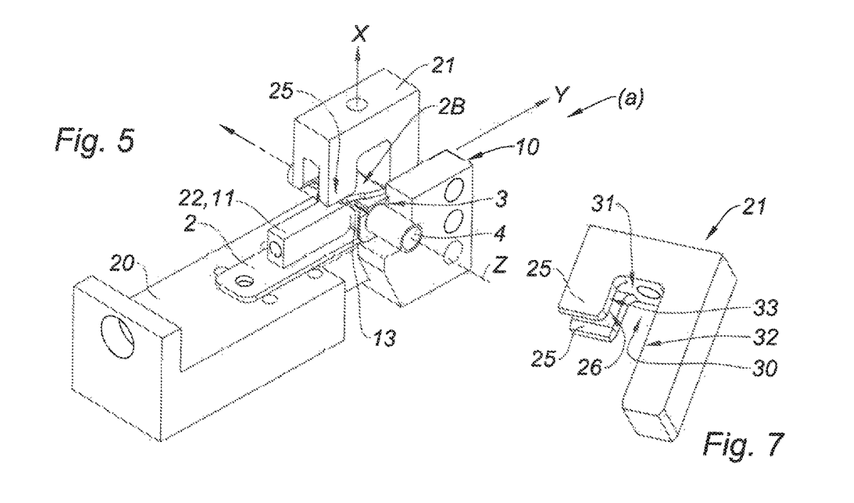
FIGS. 5 and 6 are perspective views of a step (a) of placing the pre-assembly of FIG. 3 in a forming tool comprising a first matrix part, a second matrix part and a propping core forming the propping spacer.
FIG. 7 is a detailed perspective view of the second matrix part of FIGS. 5 and 6.
Figure 22:
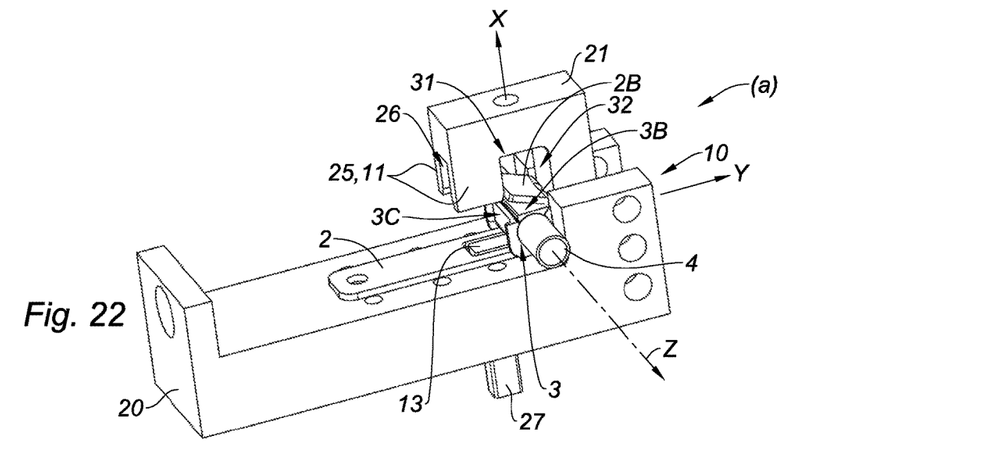
FIG. 22 is a perspective view of the forming tool of FIG. 21 during the step (a) of placing the bracket and the tubing subset within said tool.
Figure 23:
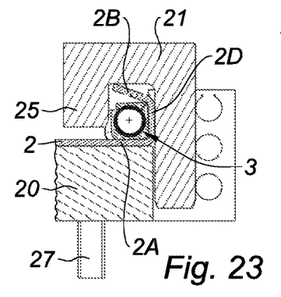
FIGS. 23 and 24 are front section views of the forming tool of FIG. 22 in the first section plane and in the second section plane respectively.

Said step (a) also comprises putting the (tubing) subset 3 between a first portion 2A of said bracket 2 and a second portion 2B of said bracket 2, as notably shown in FIG. 3, 5 or 22.

According to a possible implementation, one may firstly placing the tubing subset 3 in the bracket 2 to form a pre-assembly (as shown in FIG. 3), and then inserting said pre-assembly in the forming tool 10, prior to deforming the bracket to grip the tubing subset.

However, in view of making automation easier and more reliable, the bracket 2 will be preferably inserted first in the forming tool 10, in a stable resting position, and then the tubing subset 3 will be engaged in the forming tool 10, against the bracket which rests in said tool 10.

Initially, the elastic pad 7 is advantageously interposed between the subset element 4 and at least one of the first and second portions of the bracket 2A, 2B.

Further, said subset 3 has a first, initial thickness E3-0 at rest, as shown in FIG. 3.

The "thickness" here refers to the dimension (possibly the shortest dimension) of the portion of the subset 3 which is comprised (sandwiched) between the first portion of the bracket 2A and the second portion of the bracket 2B and which is subject to compression.

The corresponding initial thickness at rest of the elastic pad 7, i.e. the thickness of the wall of the elastomeric sleeve forming a cushion between the subset element 4 (tube element 4) and either the first portion of bracket 2A or the second portion of bracket 2B, is noted E7-0.

The process then comprises a step (b) of actuating the forming tool 10 for plastically deforming the bracket 2 so that the first 2A and second 2B portions of the bracket 2 come closer one to the other and press the tubing subset 3.

Thus is achieved gripping said tubing subset between the said first and second portions 2A, 2B of the bracket, and preferably compressing the thickness of the subset element 4 and the elastic pad 7 in a securing gap 12, 12'.

To this end, the second portion 2B of the bracket is preferably plastically bent, according to a tipping movement, from a first "open" configuration, wherein said second portion 2B preferably extends in a slanting direction with respect to the first portion 2A of the bracket, as shown in FIGS. 8, 9, 23, 24, thus providing a flared aperture for easily receiving the tubing subset 3, to a second "gripping" configuration, wherein said second portion 2B of the bracket preferably extends substantially parallel to the first portion 2A of the bracket, as shown in FIGS. 12, 13, 25, 26.

The process of the invention also comprises, during the step (b) of actuating the forming tool 10 for plastically deforming the bracket 2, a step (c) of stopping the second portion 2B of the bracket 2 at a predetermined distance d1 from the first portion 2A of the bracket, referred as "forced clamping distance" d1, thus defining a securing gap 12 that separates the first portion of bracket 2A from the second portion of bracket 2B and wherein the tubing subset 3 is secured by said first and second portions of bracket 2A, 2B without being crushed by said first and second portions of bracket 2A, 2B, as shown in FIGS. 4, 13, 14, 17, 19, 20, 26 and 29.

Figure 17:
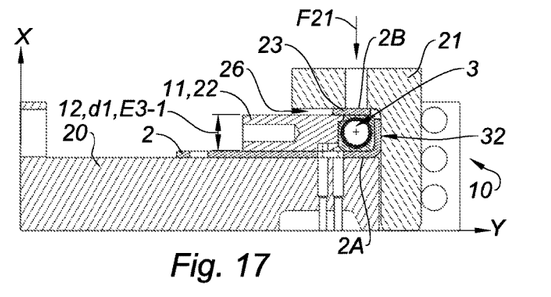
Figure 26:
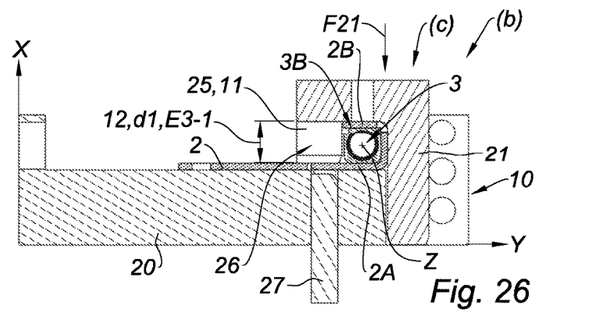

Preferably, one can thus define a first configuration of the securing gap 12, referred as "forced securing gap" 12, wherein the subset 3 has a second, reduced, intermediate thickness E3-1, as shown in FIGS. 17 and 26, which is lower than the first, initial thickness E3-0.

As further recited below, when in the forced securing gap 12, the subset 3, and more particularly the elastic pad 7 and the subset element 4 (tube element 4) thereof are advantageously elastically compressed, within their respective range of elastic deformation, so that no irreversible damage occurs which may otherwise be due to excessive compression.

The minimal, admissible value of the forced clamping distance d1, but also the properties (e.g. Young Modulus) and dimensions (e.g. thickness at rest) of the elastic pad 7 are chosen accordingly.

In a very preferred manner, which can be regarded as an invention per se, the step (c) of stopping the second portion of the bracket 2B at a predetermined distance d1 from the first portion of the bracket 2A is achieved by means of a propping spacer 11, distinct from the subset 3.

In other words, said step (c) preferably comprises using a propping spacer 11 for stopping the second portion of the bracket 2B at the desired predetermined distance d1 from the first portion of the bracket 2A.

Advantageously, the propping spacer 11 prevents the second portion of the bracket 2B from coming closer to the first portion of bracket 2A than the forced clamping distance d1, so as to preserve the securing gap 12, i.e. a separating interval between the first and second portions of bracket 2A, 2B, in which the tubing subset 3 is situated and pressed by said first and second portions of the bracket 2A, 2B.

The process also comprises a step (e) of releasing the bracket and subset assembly 1 from the forming tool 10.

Accordingly, the pressure exerted by the forming tool 10 on the bracket 2 (and on the subset 3) stops and the forming tool 10 is removed, thus releasing the finished bracket and subset assembly 1.

During said step (e), the plastically deformed bracket 2 (resulting from the plastic deformation step (b)) elastically and partially relaxes, so that the second portion of the bracket 2B moves back at a distance d2 from the first portion of the bracket 2A, referred as "residual clamping distance" d2, which is greater than the forced clamping distance d1, so that the securing gap 12 adopts a second configuration referred as "residual securing gap" 12', as shown in FIGS. 4, 18, 19, 20 and 29, wherein the subset 3 has a third, final thickness E3-2, which is greater than the second intermediate thickness E3-1.

Advantageously, the forced clamping distance d1 is chosen so that, within the residual securing gap 12' resulting from releasing the bracket and subset assembly 1 from the forming tool 10, the final thickness E3-2 of the subset 3 is lower than the first, initial thickness E3-0 thereof.

Consequently, the forced clamping distance d1 is (also) chosen so that the residual clamping distance d2 derived from said forced clamping distance (i.e. from the plastic bending and subsequent elastic springback of the second portion 2B of the bracket) is lower than the initial thickness E3-0 of the subset, so that elastic pad 7 is residually (and elastically) compressed in the residual, finally resulting, securing gap 12'.

More preferably, the clamping distance d1 is also chosen so that, within the residual securing gap 12' resulting from releasing the bracket and subset assembly 1 from the forming tool 10, the elastic pad 7 is residually compressed of 1% to 40% in thickness (E7-2 in FIG. 4), preferably of 1% to 15% in thickness, and possibly of 5% to 10% in thickness, by comparison with said elastic pad's thickness E7-0 at rest.

In other words, considering the residual thickness E7-2 of the elastic pad 7 (FIG. 4) with respect to the corresponding initial thickness E7-0 of said pad 7 (FIG. 3), the resulting compression ratio of the elastic pad 7 within the residual securing gap 12' is:

$$60\% < (E7\text{-}2)/(E7\text{-}0) < 99\%$$

or preferably:

$$85\% < (E7\text{-}2)/(E7\text{-}0) < 99\%$$

More globally, the elastically pad 7 is residually compressed in thickness of at least 1%, preferably at least 2%, possibly at least 5% or even at least 10%, but also less than 50%, preferably less than 40%, and possibly less than 30%, possibly less than 20% or even less than 15%.

Advantageously, the subset 3 is (finally) secured in the residual securing gap 12' by the first and second portions of bracket 2A, 2B without the subset element 4 being crushed by said first and second portions of bracket 2A, 2B.

Pursuant to the invention, the clamping distance d1 is thus chosen on the one hand to be sufficiently short to have the plastically deformed first and second portions of the bracket 2A, 2B achieve an actual pressing and gripping effect (due to residual elastic compression forces) on the tubing subset 3 (and more particularly on a rigid element of said tubing subset, such as a pipe element 4), so that the tubing subset is firmly held within said securing gap 12, and on the other hand to be sufficiently long to prevent said tubing subset 3 from being crushed by said first and second bracket portions 2A, 2B (notably during the step (b) of actuating the forming tool 10 for plastically deforming the bracket 2).

"Preventing from being crushed" means that the stresses caused in the (tubing) subset 3, and more particularly the stresses caused in the subset element 4 (tube element 4), by compressing the (tubing) subset 3 between the first and second portions of bracket 2A, 2B, to the forced clamping distance d1, and then back to the residual clamping distance d2, remains below a predetermined, admissible stress limit, e.g. a conventional elasticity limit, noted Re, or an elasticity limit with a 0.2% plastic deformation, noted Rp0.2, of the subset 3, and more particularly of the subset element 4, so that neither excessive deformation nor destructive damage occurs that would adversely affect the structure and/or the function of the (tubing) subset 3 considered as a whole, and in particular the subset (tube) element 4.

Preferably, the clamping distance d1, i.e. the thickness of the securing gap 12, is (exactly) equal to the thickness of the propping spacer 11.

Accordingly, the propping spacer 11 can be engaged immediately adjacent to the tubing subset 3, between the first and second portions of the bracket 2A, 2B, so as to directly act on (and bear against) the respective opposed surfaces of said first and second portions of the bracket 2A, 2B that face one another on either side of the tubing subset 3 and that bear against the tubing subset 3, as shown in FIGS. 5, 9, 13 and 17.

Thus, the forming tool 10 can be particularly simple and compact.

In addition, as shown in said FIGS. 5, 9, 13 and 17, the propping spacer 11 may be engaged in contact with a side face of the tubing subset 3 (said side face being here substantially perpendicular to the first and second portions of bracket), so as to help supporting and immobilizing said tubing subset in the bracket 2 during the deforming process.

As recited above, if any, the elastomeric sleeve 7 is elastically pressed by the first and second portions of bracket 2A, 2B (together with the tube element 4) within the securing gap 12.

Preferably, the manufacturing process comprises, once (after) the second portion of the bracket 2B has reached the forced clamping distance d1 from the first portion of the bracket 2A, a step (d) of further plastically bending around and against the (tubing) subset 3, across the (forced) securing gap 12, a third portion 2C of the bracket 2, which third portion of the bracket 2C is attached to the first portion 2A or to the second portion 2B of the bracket 2, while the second portion of the bracket 2B is held at the forced clamping distance d1 (at least or preferably exactly at said forced clamping distance d1) from the first portion of the bracket 2A, and more particularly while the propping spacer 11 holds (is still holding) said second portion of the bracket 2B at the forced clamping distance d1 from the first portion of the bracket 2A, as shown in FIGS. 15, 16, 17 or 27 and 28.

Said feature of further bending the third portion 2C can be regarded as an invention per se, notably in combination with using a propping spacer 11 as recited above, and irrespective of the actually chosen value of the clamping distance d1, or irrespective of any feature regarding a residual compression rate of the elastic pad 7.

In other words, the proposed process, and the corresponding forming tool 10, makes it possible to fold up additional portions (for instance the third portion 2C) of the bracket 2 over and preferably against the tubing subset 3, at an angle, preferably substantially a right angle, with the first and/or second portions 2A, 2B of the bracket, so as to form additional (lateral) barrier (s) that provide a secondary effect of enhancing the fixation of said tubing subset 3 within the bracket 2, while still keeping the primary effect achieved by the first and second portions of bracket 2A, 2B placed at the forced clamping distance d1 one from the other and consisting in gripping the subset 3 without crushing.

More particularly, the third portion of bracket 2C may achieve a pressing force against the tubing subset 3, in a second gripping direction, referred as Y-axis, which completes the pressing force exerted by the first and second portions of the bracket 2A, 2B in a first gripping direction, referred as X-axis, which is secant (and preferably perpendicular) to said second gripping direction Y.

On the figures, X-axis is vertical, and Y-axis is horizontal.

The process thus achieves a reliable and stable fixation of the tubing subset 3 in the bracket 2.

In addition, thanks to the propping spacer 11, the bending operation of the third portion of bracket 2C pursuant to step (d) may be advantageously achieved within the same forming tool 10 as the deforming operation of step (c), without it being necessary to open or change said forming tool 10, or to release or make loose the processed parts (bracket 2 and tubing subset 3), and possibly in using a unique direction (for instance along the vertical X-axis) for the closing movement of the forming tool 10, said direction being orthogonal to the parting line of said tool.

Thus are avoided uncontrolled displacements or losses of the processed parts, and time waste.

Figure 4:
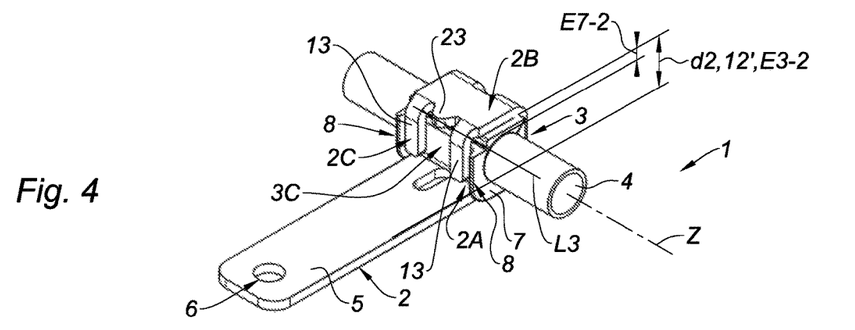
FIG. 4 is a finished bracket and tubing assembly according to a first variant of the invention that results from plastically processing the pre-assembly shown in FIG. 3 in a forming tool pursuant to the invention.
Figure 19:
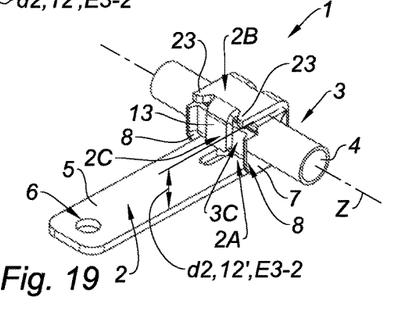
FIG. 19 is a perspective view of a second, alternative variant of bracket and tubing assembly which can be obtained by a process substantially similar to the process of FIGS. 8 to 18, but wherein the bracket comprises two arresting tabs on either side of a single central leg.
Figure 20:
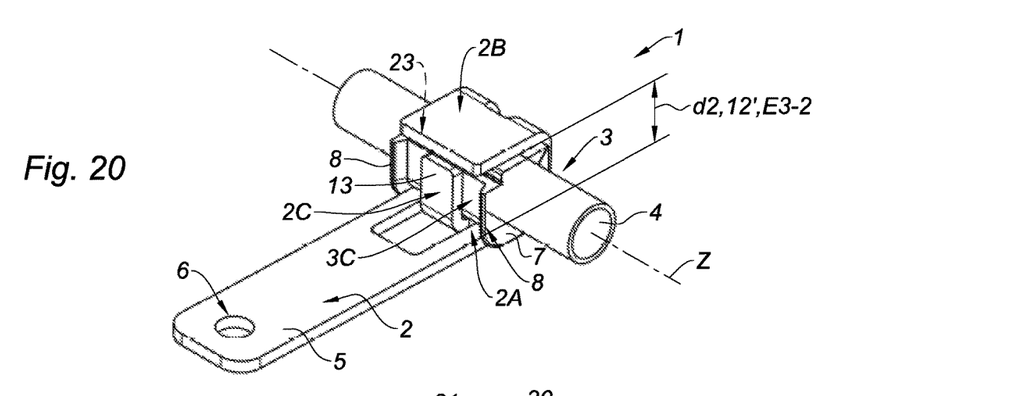
FIG. 20 is a perspective view of a third, alternative variant of bracket and tubing assembly comprising a third portion of the bracket that is attached to the first portion of the bracket and which forms a central leg.
Figure 21:
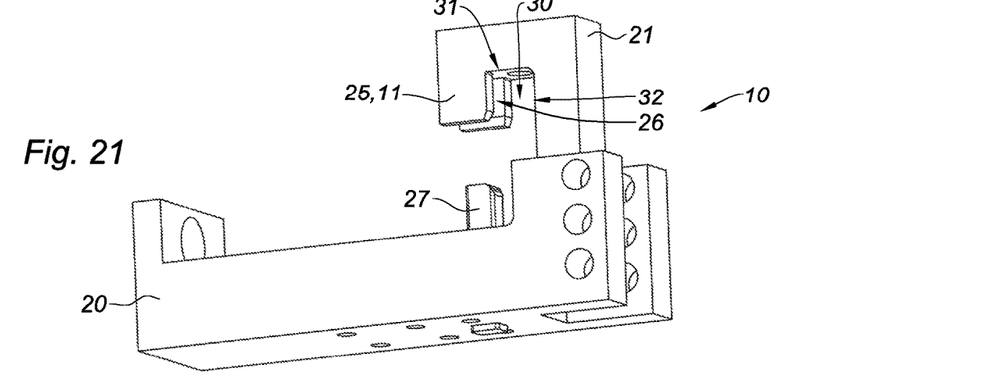
FIG. 21 is a perspective view of a forming tool for manufacturing the bracket and tubing assembly of FIG. 20, said forming tool comprising a first matrix part, a second matrix part and a punch.
Figure 29:
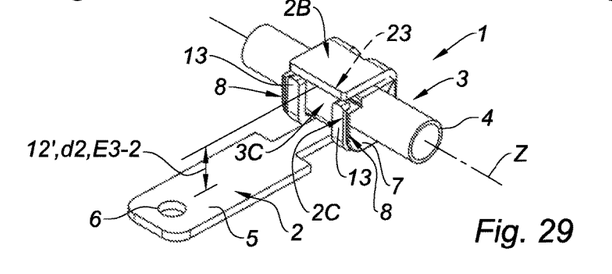
FIG. 29 is a perspective view of a fourth, alternative variant of bracket and tubing assembly which can be obtained by a process substantially similar to the process of FIGS. 22 to 28, but wherein the third portion of the bracket comprises two legs on either side of a central area of the first portion of the bracket which is intended to receive a single, central pillar of a suitable second matrix part.

The third portion of the bracket 2C may advantageously comprise, or consist in, one leg 13, as shown in FIG. 19 or 20, or a plurality of (preferably two) legs 13, as shown in FIG. 3, 4 or 29.

Said leg or legs 13 extend (in length) from a first end, or "root end", which is attached to a portion of the bracket 2A, 2B, to a second, opposite, free end, which is preferably oriented, once the leg is bent, toward the other, facing portion of the bracket 2B, 2A.

The leg(s) 13 may be attached to, i.e. the root end of the considered leg may be connected to, either the second portion of bracket 2B (here the upper portion of the bracket), as shown in FIGS. 3, 4 and 19, or the first portion of the bracket 2A (here the lower portion of the bracket), as shown in FIGS. 20 and 29.

Preferably, all legs 13 (i.e. the full third portion 2C of the bracket) are attached (solely) to the same portion of the bracket, i.e. exclusively to the first portion 2A, or to the second portion 2B.

However, one may consider having a mixed arrangement comprising leg(s) attached to the first portion 2A and other leg(s) attached to the second portion of bracket 2B.

Irrespective of the arrangement, the leg(s) 13 is (are) preferably made of one piece with the (sole) first portion 2A of the bracket, respectively with the (sole) second portion of the bracket, the considered third portion 2C of the bracket is attached to.

It is also noted that the third portion 2C, and more particularly the leg(s) 13, are preferably shorter than the forced clamping distance d1, so that after bending, the free end of the leg 13 does not touch or otherwise interfere with the portion of the bracket 2A (e.g. the first portion) facing the portion of the bracket 2B (e.g. the second portion) from which the considered leg 13 originates.

Bending operation of the leg 13 is thus very simple and fast.

As mentioned above, the subset element 4 of the subset 3, and more particularly the tube element 4 of the tubing subset 3, has a central axis, referred as Z-axis.

Figure 14:
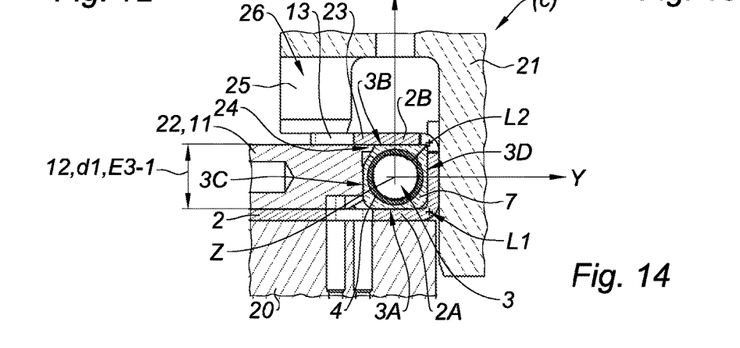
FIG. 14 is a detailed view of FIG. 13.
Figure 28:
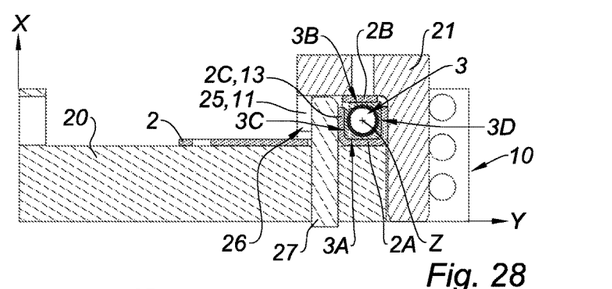

Accordingly, and for convenience, the (tubing) subset 3 may be regarded as being laterally delimited around said central Z-axis by four faces, namely a lower face 3A, an upper face 3B (diametrically) opposed to the lower face, a left face 3C, and a right face 3D (diametrically) opposed to the left face 3C, as notably shown in FIG. 14 or 28.

The (tubing) subset 3, and more particularly the elastomeric sleeve 7, may advantageously have a substantially rectangular or substantially square cross-section, so that the lower face 3A is substantially parallel to upper face 3B, and substantially perpendicular to the left face 3C and the right face 3D, which are also parallel one to the other.

Such a design is easy to manufacture, and provide a efficient and stable gripping.

Figure 2:
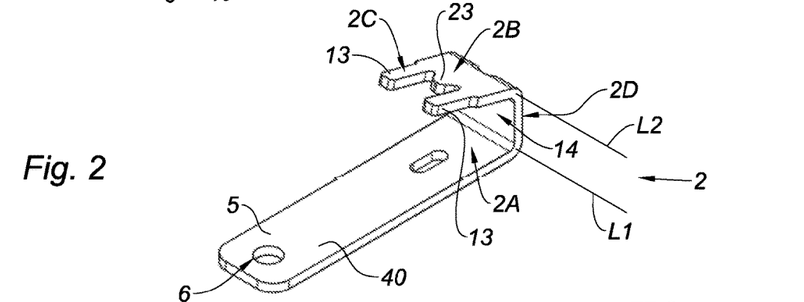
FIG. 2 is a perspective view of a first variant of bracket obtained from the strip of FIG. 1, prior to placing said bracket in the forming tool, said bracket being preformed so as to include a U-shaped recess for receiving a tubing subset.

Preferably, according to a feature which can be an invention per se, and which may be adapted to any arrangement of third portion of the bracket 2C, the bracket is pre-formed prior to step (a) of placing the bracket 2 and the (tubing) subset 3 in the forming tool 10, so that said bracket 2 includes a substantially U-shaped recess 14 having a first branch corresponding to the first portion of bracket 2A, a second branch corresponding to the second portion of bracket 2B, and a connecting branch that connects the first branch 2A to the second branch 2B and which corresponds to a fourth portion of bracket 2D, as shown in FIG. 2.

Figures 9, 10:
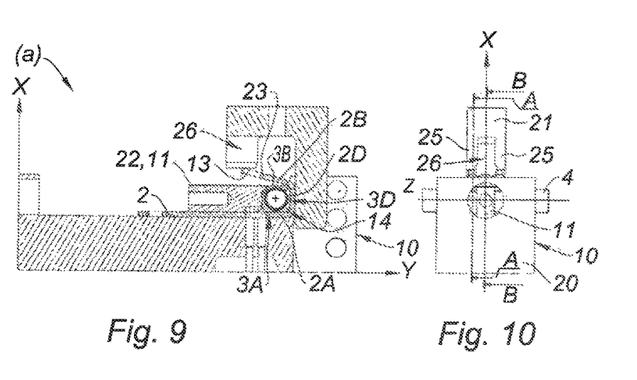
FIG. 10 is a lateral view of the forming tool of FIGS. 5, 6, 8 and 9.
Figure 24:
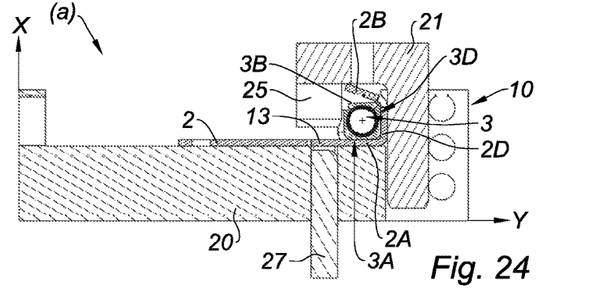

Preferably, during step (a) of placing the bracket 2 and the (tubing) subset 3 in the forming tool 10, the (tubing) subset 3 is placed within the U-shaped recess 14 of the bracket 2 so that the lower face 3A of the (tubing) subset 3 abuts against the first portion of the bracket 2A and the right face 3D of the (tubing) subset 3 abuts against the fourth portion 2D of the bracket, as shown in FIGS. 3, 9 and 24.

Such a U-shaped recess 14 provides a guiding and stopping arrangement that helps to accurately placing the tubing subset 3 within the bracket 2 and within the forming tool 10.

Preferably, during the step (b) of actuating the forming tool 10 for plastically deforming the bracket 2, the second portion of the bracket 2B is plastically bent toward the first portion of the bracket 2A and thus brought into abutment against the upper face 3B of the (tubing) subset, at the forced clamping distance d1 from the first portion of the bracket 2A, so as to grip the tubing subset 3 between the first and second portions of the bracket 2A, 2B in a first gripping direction $\underline{X}$ (X-axis) which is transverse to the central Z-axis, as shown in FIGS. 12, 13, 14, 25 and 26.

Figure 16:
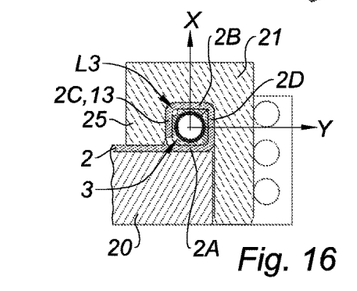
FIGS. 16 and 17 are front section views of the forming tool of FIG. 15 in the first section plane and in the second section plane respectively.

In addition, during the step (d) of further plastically bending a third portion of the bracket 2C, said third portion of bracket 2C, for instance one leg 13 or more, is preferably plastically bent toward the fourth portion of the bracket 2D and brought into abutment against the left face 3C of the (tubing) subset 3, so as to grip the (tubing) subset 3 between the third and fourth portions of the bracket 2C, 2D, in a second gripping direction $\underline{Y}$ (Y-axis) which is transverse to the central Z-axis and secant, and preferably perpendicular, to the first gripping direction $\underline{X}$ (X-axis), as shown in FIGS. 16, 17 and 28.

In other words, the bracket 2 may advantageously be plastically formed by the forming tool 10 into a wrapping frame, with four barriers 2A, 2B, 2C, 2D, which surrounds and wraps the (tubing) subset 3 over more than 270 degrees, and possibly over almost 360 degrees, around the central Z-axis, thus holding said (tubing) subset 3 in all directions around said central Z-axis.

Two of these barriers, namely the lower barrier (first portion) 2A and the right barrier (fourth portion) 2D are preferably already in blocking position in the step (a) of placing the bracket 2 and tubing subset 3 in the tool 10, when the U-shaped recess 14 is in open configuration, whereas the third, upper barrier (second portion) 2B is brought in blocking position, against the upper face 3B of the tubing subset, during the first time of step (b) of plastically deforming the bracket, until the step (c) of stopping occurs, and the fourth, left barrier (corresponding to the third portion 2C, i.e. the leg 13) is finally brought in blocking position by further bending the third portion of the bracket 2C in step (d).

The bidirectional, crossed gripping effect achieved both in X and Y (orthogonal) directions results in a firm gripping of the tubing subset 3, substantially similar to a constriction.

It is noted that further bending leg(s) 13 over the subset 3 pursuant to step (d) achieves plastically creating a new bend line L3 in the bracket, and more particularly adding a (third) bend line L3 to (first and second) bend lines L1, L2 which separate the second portion of the bracket 2B from the first portion of the bracket 2A and correspond to the corners of the U-shaped recess 14 (see FIGS. 2 and 4).

It is also noted that the propping spacer 11 may also help in laterally pressing the (tubing) subset 3 (in the Y direction) against the fourth portion 2D of the bracket 2 during steps (b) and (c), and possibly (d), until the third portion 2C is sufficiently bent against said tubing subset 3 to ensure the secondary gripping effect in Y direction.

It is further noted that, when the leg or legs 13 are preferably shorter than the gap thickness (notably the forced clamping distance d1), the bracket 2 finally forms around the (tubing) subset 3 a wrapping frame having the shape of an open loop, i.e. a loop which is not fully closed, so that said wrapping frame is similar to a slit cylinder (oriented along the Z-axis), and substantially achieves a constriction effect on said (tubing) subset 3 by the sole means of the intrinsic rigidity of the bent bracket 2.

More globally, the (finished) bracket and subset assembly 1 of the invention is advantageously devoid of any additional fixation means, such as screw, rivet, welding bead, or hooking flaps, which would be implemented after the bending operations of steps (b) and (d) and intended for additionally and forcibly connecting and anchoring the second portion of the bracket 2B (and/or the third portion of the bracket 2C) to the first portion of the bracket 2A, over the securing gap 12 (thus closing the access aperture of the U-shaped receiving recess 14).

Accordingly, the process of the invention is preferably devoid of any step of forcibly connecting and anchoring (against the resisting force opposed by the tubing subset 3) the second portion of the bracket 2B or, if any, the third portion of the bracket 2C, to the first portion of the bracket 2A (into a closed loop) over the securing gap 12 and the (tubing) subset 3, notably by screwing, riveting, welding, gluing or hooking (or any equivalent mechanical anchoring process).

Indeed, thanks to the proposed arrangement of the bracket 2, the own rigidity of the bracket 2 as deformed (bent) according to the process of the invention is sufficient to make the first portion of the bracket 2A and the second portion of the bracket 2B (respectively the third and the fourth portions of the bracket 2C, 2D) generate a compressing force that sandwiches the tubing subset 3 between said bracket portions 2A, 2B and thus achieves the expected gripping effect, without it being necessary to use additional fixation means for creating said compression force.

Regardless of the variant of the manufacturing process or the bracket and tubing assembly 1, the propping spacer 11 is preferably a part of the forming tool 10.

Accordingly, said propping spacer 11 is preferably removed (as a whole) from the bracket and subset assembly 1 prior to extracting the (finished) bracket and subset assembly 1 from the forming tool 10.

Thus, the propping spacer 11 is preferably not left in the finished, ready-to-use bracket and subset assembly 1.

The propping spacer 11 is thus fully re-usable for manufacturing a whole series of bracket and subset assemblies 1, which makes automation easier, and saves material, costs and time.

As shown in FIGS. 5 to 18 and 21 to 28, the forming tool 10 preferably comprises a first matrix part 20 for receiving the first portion of the bracket 2A and a second matrix part 21 which is pressed against the first matrix part 20 during the step (b) of actuating the forming tool 10 for plastically deforming the bracket 2, according to a closing movement F21 which makes the said second matrix part 21 plastically bend the second portion of the bracket 2B toward the first portion of the bracket 2A, until said second portion of the bracket 2B reaches the forced clamping distance d1 from the first portion of the bracket 2A, as shown in FIGS. 11 to 14 and 25, 26.

Preferably, the first matrix part 20, which is the lower matrix part in the figures, constitutes a static part of the forming tool 10, forming a kind of anvil, on which the bracket 2 rests, while the second matrix part 21, here the upper matrix part, is preferably a moving part.

Said first and second matrix parts 20, 21 are made of a suitable rigid material, such as hardened steel.

Preferably, the closing movement F21 (here moving down) is substantially rectilinear, and more preferably oriented in the X (vertical) direction, substantially perpendicular to the parting line of the matrix parts 20, 21.

Figures 11, 12A:
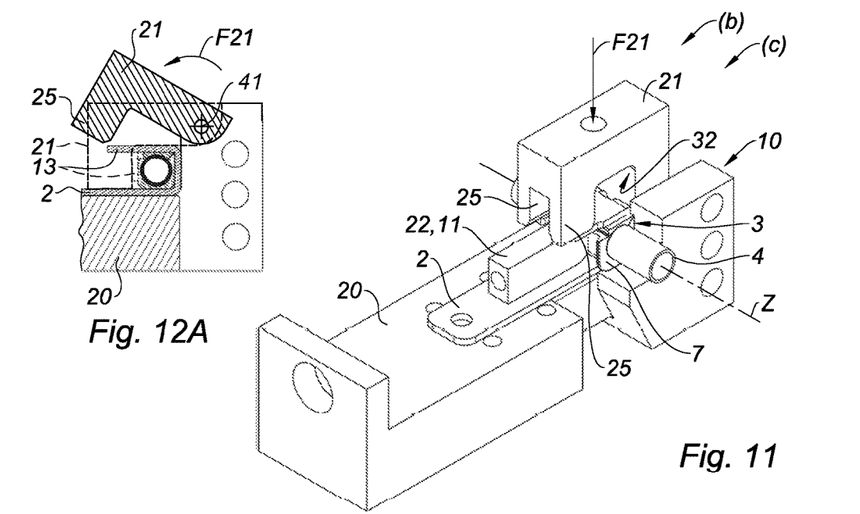
FIG. 11 is a perspective view of the forming tool of FIGS. 5 to 10 at a step (c) of using the propping core for stopping the second portion of the bracket at a distance from the first portion of said bracket, by means of an arresting tab that protrudes on the second bracket portion and comes into abutment against said propping core.
FIG. 12A is a front section view in the first section plane of an alternative forming tool having a rotary closing movement instead of a rectilinear translating closing movement.
Figure 12:
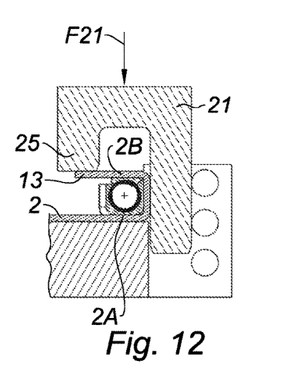
FIGS. 12 and 13 are front section views of the forming tool of FIG. 11 in the first section plane and in the second section plane respectively.

Alternatively, the closing movement F21 may be a rotary movement, preferably with the second matrix part 21 rotating about a swivel 41 with respect to the first matrix part 20, as schematically shown in FIG. 12A.

Of course, the closing movement F21 may consist in any suitable combination of (rectilinear) translation and rotation.

According to a possible implementation of the process, and as shown in FIGS. 5, 6 and 8 to 18, the propping spacer 11 used in step (c) for stopping the second portion of bracket 2B may be formed by a propping core 22 that is distinct from the first and second matrix parts 20, 21, said propping core 22 being inserted between said first and second matrix parts 20, 21, and preferably between the first and second portions of the bracket 2A, 2B, prior to the step (b) of actuating the forming tool 10 for plastically deforming the bracket 2.

Advantageously, such a propping core 22 can be inserted in one piece in a cavity of the forming tool 10, separately from the matrix parts 20, 21, between the first matrix part 20 and the second portion of the bracket 2B, so that the thickness of the propping core 22 sets the forced clamping distance d1.

More preferably the propping core 22 can be inserted between the first portion of the bracket 2A resting on the first matrix part 20 and the second portion of the bracket 2B that is pressed (on the opposite side) by the second matrix part 21, i.e. the propping core 22 may be engaged in the aperture of the U-shaped recess 14.

Figure 6:
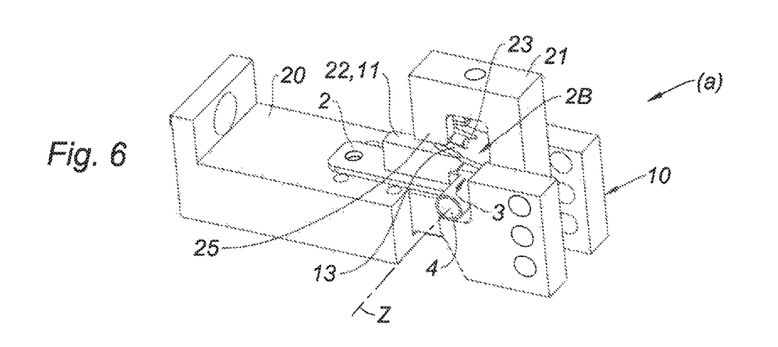
Figure 8:
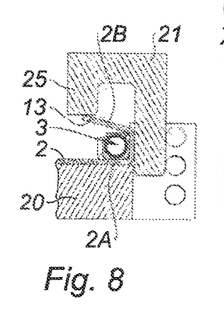
FIGS. 8 and 9 are front section views of the forming tool of FIGS. 5 and 6 respectively in a first section plane and in a second section plane corresponding to a sagittal plane.

In such an arrangement, the propping core 22 is preferably urged (horizontally) against the left face 3C of the tubing subset 3, while being supported (vertically) by the first portion of the bracket 2A, as shown in FIGS. 5, 6 and 9

In such an arrangement, the thickness of the propping core 22 is advantageously chosen equal to the desired forced clamping distance value d1, so as to directly set the said forced clamping distance d1 when both the first and second portion of the bracket 2A, 2B bear respectively against the lower and upper surfaces of said propping core 22, as shown in FIGS. 11, 12, 13 and 14.

It is noted that such an arrangement helps in automatically positioning the bracket 2 and the tubing subset 3 in the (open) forming tool and firmly holding said bracket 2 and tubing subset 3 in said tool 10 by means of the propping core 22, prior to and during the step (b) of plastically deforming the bracket 2.

The propping core 22 may be advantageously inserted in (prior to step (b) of plastically deforming) and then removed from the forming tool 10 (after the step (b) of plastically deforming the second portion 2B of bracket is achieved, or preferably after the step (d) of further bending the legs 13 is achieved) by rectilinear, translation, here along the Y direction, and may be therefore preferably slidingly supported and guided along the supporting arm 5 of the bracket, which is situated in the extension of the first portion 2A of the bracket.

The propping core 22 is preferably made of one massive piece, preferably a parallelepiped, of rigid material, such as hardened steel.

Preferably, the propping core 22 forms a blocking stop that is physically placed on the bending (deforming) trajectory of the second portion of the bracket 2B, so as to directly interact with said second portion 2B, in view of "intercepting" and stopping said second portion 2B at the forced clamping distance d1 from the first portion of bracket 2A.

To this end, the second portion of the bracket 2B preferably comprises at least one arresting tab 23 which is arranged to come into abutment against the propping core 22 when the second portion of the bracket 2B reaches the forced clamping distance d1 from the first portion of bracket 2A.

The arresting tab 23 preferably protrudes on the second portion of the bracket 2B, in the longitudinal and planar extension thereof, with the same thickness as the second portion 2B, and is preferably made of one piece with said second portion of the bracket 2B.

When the arresting tab 23 hits the propping core 22 (here the upper surface thereof), as shown in FIGS. 11 to 14, said arresting tab 23 becomes compressed between the closing (going down) second matrix part 21 and the resisting propping core 22 supported by the first matrix part 20 (directly or indirectly via the first portion of the bracket 2A), so that the deforming (bending) movement of the second portion of the bracket 2B with respect to the first portion of bracket 2A is immediately and automatically stopped.

The bracket 2, and more particularly the second portion 2B thereof, may comprise a single arresting tab 23, preferably situated in a central position between two adjacent legs 13 (FIGS. 3, 4, 6, 18), a continuous arresting tab 23 forming a free edge of the second portion of the bracket 2B, when legs are attached to the first portion of the bracket 2A (FIGS. 20 and 29), or a plurality of arresting tabs 23, e.g. two arresting tabs 23 located on either side of a central (unique) leg 13 (FIG. 19).

Preferably, as shown in FIG. 14, the propping core 22 may have an overhanging (upper) corner 24 that protrudes towards the tubing subset 3, beneath the (moving) second portion 2B of the bracket and the arresting tab(s) 23, for opposing a larger abutting surface to the arresting tab(s) 23.

Preferably, the overhanging corner 24 is outwardly slanted, as shown in FIG. 14, thus improving the stress resistance of said corner (notably in X direction), and also providing a wedge that helps urging the tubing subset 3, when inserting the propping core 22 in the U-shaped recess 14, simultaneously against both the lower, first portion 2A and the right, fourth portion 2D of the bracket.

Figure 18:
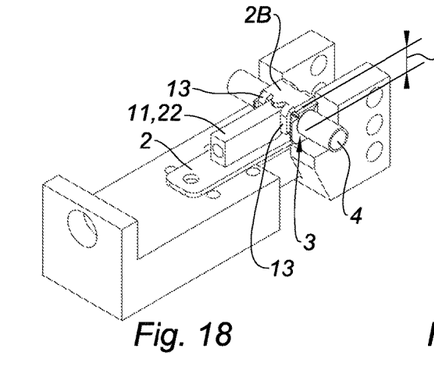
FIG. 18 is a perspective view of the forming tool of FIGS. 5 to 17 when opening said forming tool, and removing the second matrix part, for releasing the finished bracket and tubing assembly pursuant to the first variant of the invention.

Preferably, as shown by the first and second variants of assemblies 1 in FIGS. 4, 18 and 19, the third portion of the bracket 2C may be attached to, and more preferably made of one piece with, the second portion of the bracket 2B.

Figure 15:
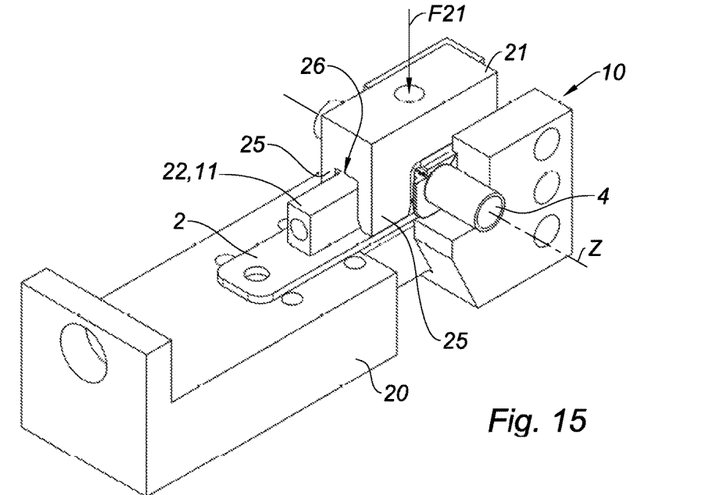
FIG. 15 is a perspective view of the forming tool of FIGS. 5 to 14 during a step (d) of further bending around the tubing subset, by means of the second matrix part, a third portion of the bracket attached to the second portion of the bracket and comprising two legs situated on either side of the propping core.

In such a case, once (after) the arresting tab 23 and the second portion of the bracket 2B are stopped by the propping core 22 pursuant to step (c), the second matrix part 21 may advantageously continue the closing movement F21 toward the first matrix part 20, so as to achieve the step (d) of further bending the third portion of the bracket 2C in plastically folding said third portion of the bracket 2C (leg (s) 13) toward the first portion of the bracket 2A, over the (tubing) subset 3, beyond the propping core 22 (beyond the arresting surface of the overhanging corner 24 of said propping core), as shown in FIGS. 15, 16 and 17.

In other words, the process may use a unique global closing movement F21 to achieve a differential bending operation comprising:

a first bending (or "half-course") operation of plastically bending the second portion 2B of the bracket until said second portion 2B reaches the forced clamping distance d1 and the arresting tab 23 thereof hits the propping core 22, as shown in FIGS. 11 to 14;

a second, subsequent bending (or "full-course") operation of plastically bending (downwardly) toward the first portion 2A of the bracket the third portion 2C, i.e. the leg(s) 13, which are not propped by the propping core 22, while still blocking the second portion 2B at the forced clamping distance d1 from the first portion of bracket 2A, as shown in FIGS. 15 to 17.

For this purpose, the propping core 22 is preferably arranged to selectively support (prop), and consequently stop, predetermined portions of the bracket 2, for instance the second portion 2B thereof which must stay (at least) at the forced clamping distance d1 defining the (lower, admissible) limit of the securing gap 12, while allowing other portions of the bracket, for instance the third portion 2C (leg 13), which are not supported by said core 22, to be further bent beyond the said securing gap limit.

For example, a suitable propping core 22 for manufacturing the first variant of FIGS. 3, 4, 18 may preferably comprise a unique massive portion, including the overhanging corner 24, which is narrower than the second portion 2B of the bracket and arranged for stopping a central, unique arresting tab 23, while leaving passages for (two) lateral legs 13 on either side of said propping core 22; said legs being preferably bent simultaneously with a fork-like second matrix part 21 that comprises two pillars 25 separated by a wall passage 26 (thus forming an arch) and that steps over the central propping core 22, as shown in FIG. 15.

According to another example, a suitable propping core 22 for manufacturing the second variant of FIG. 19 may conversely be fork-shaped (clevis-shaped), so as to comprise on the one hand a dual arresting surface (a dual corner 24) for simultaneously stopping the two lateral arresting tabs 23, and on the other hand a central core-passage for allowing further bending of the central leg 13 through the core by a second matrix part 21 having a corresponding (unique) central pillar 25.

It is noted that deforming (bending) the second portion 2B of the bracket during the first bending operation, according to step (b), is here (FIGS. 6 to 14) preferably achieved by catching and pressing the third portion 2C (leg(s) 13) with the second matrix part 21 (pillar(s) 25), so as to jointly drag, toward the first portion of the bracket 2A, the third portion 2C and the second portion 2B attached thereto, as long as the second portion of the bracket 2B, and more particularly the arresting tab(s) 23, does not hit the propping spacer 11 (propping core 22).

It is also noted that the step (d) of further bending the leg(s) 13 finishes when the second matrix part 21 hits the first matrix part 20 or a portion of the bracket 2 (either the first portion 2A, or the second portion 2B) which is supported by said first matrix part 20, as shown on FIGS. 15 to 17.

The step (d) of further bending the leg(s) may thus possibly finish when the second matrix part 21 hits the upper surface of the arresting tab 23, while said arresting tab 23 is firmly supported (from the bottom) at a fixed distance d1 from the first portion of the bracket 2A by the propping core 22, which is in turn supported by the first matrix part 21 either directly or indirectly via the first portion of the bracket 2A.

Accordingly, at the end of said step (d) of further bending the leg(s) 13, the arresting tab 23 may be thus (directly) sandwiched between the second matrix part 21 (from above) and the propping core 22 resting on the first matrix part 20 (from the bottom).

Alternatively, the step (d) of further bending the leg(s) 13 may preferably finish when at least a pillar 25 of the second matrix part 21 hits the first matrix part 20, either directly, or indirectly when hitting a portion of the bracket 2 (for instance the first portion 2A) which rests on, and is supported by said first matrix part 20, as shown in FIGS. 15 to 17.

It is also noted that, although the propping core 22 is preferably arranged to selectively stop the second portion of the bracket 2B without interrupting the closing movement F21 of the matrix, said propping core 22 may alternatively be arranged to simultaneously engage the first matrix part 20 and the second matrix part 21 as soon as the forced clamping distance d1 is reached, so as to stop said closing movement F21 and (fully) block the second matrix part 21 with respect to the first matrix part 20.

More globally, the propping spacer 11 may be arranged either to make the bracket 2 partially (for instance the second portion of the bracket 2B) resist the closing movement F21 of the forming tool 10, while the closing movement F21 continues, or to actually stop said closing movement F21 as soon as the forced clamping distance d1 is achieved.

Figure 25:
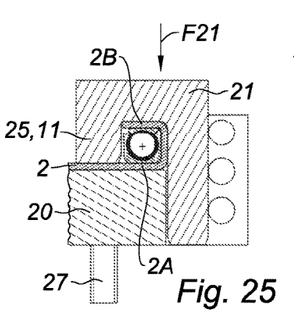
FIGS. 25 and 26 are front section views of the forming tool of FIGS. 22 to 24 in the first section plane and in the second section plane respectively, at a step (c) of stopping the second portion of the bracket at a distance of the first portion of the bracket, by means of at least one pillar of the second matrix parts which comes into abutment against said first portion of the bracket, while said first portion of the bracket rests on the first matrix part.

According to another possible implementation of the process, and as shown in FIGS. 21 to 28, the propping spacer 11 used in step (c) for stopping the second portion of bracket may be formed by a pillar 25 (or possibly two pillars 25 separated by a wall passage 26 as recited above) of the second matrix part 21 that comes into abutment against the first matrix part 20 and/or against the first portion of the bracket 2A supported by said first matrix part 20, so as to stop the closing movement F21 of said second matrix part 21 when the second portion of the bracket 2B reaches the forced clamping distance d1 from the first portion of bracket 2A, as shown in FIGS. 25 and 26.

The height (in X direction) of said pillar 25 is chosen accordingly so as to define the desired forced clamping distance d1, together with taking into consideration the thickness of the second portion of the bracket 2B interposed between the second matrix part 21 and the tubing subset 3.

Finally, it is noted that, pursuant to the invention, mechanically stopping the bending movement of the second portion of the bracket 2B (FIGS. 13 and 26), possibly by mechanically stopping the closing movement F21 of the second matrix part 21 as a whole with respect to the first matrix part 20 (FIG. 26), may be achieved either by a propping spacer 11 formed by a propping core 22 which is distinct from, mobile relative to, and inserted between the first and second matrix parts 20, 21 (FIG. 13), or by a pillar 25, acting as and thus forming a propping spacer 11, which is part of a one of said first matrix part 20 or preferably second matrix parts 21 (FIG. 26).

As mentioned above, and as shown by the third and fourth variants in FIGS. 20 and 29, the third portion of the bracket 2C, i.e. one leg 13 or more, may be attached to, and preferably made of one piece with, the (static) first portion of the bracket 2A, instead of being attached to the (mobile) second portion of the bracket 2B.

Further, once the step (c) of stopping the second portion of bracket is achieved, the second matrix part 21 and the propping spacer 11 (and more particularly here the pillar(s) 25 forming said propping spacer) may be in a situation of pressing and (firmly) holding the first portion of the bracket 2A (stacked on the first matrix part 20) against the first matrix part 20, as shown in FIGS. 25 and 26.

Figure 27:
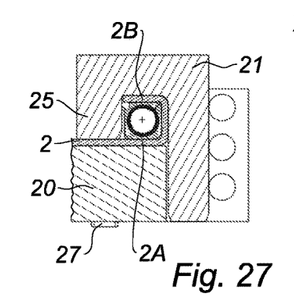
FIGS. 27 and 28 are front section views of the forming tool of FIGS. 22 to 26 in the first section plane and in the second section plane respectively, during a step (d) of further bending around the tubing subset, by means of a punch that emerges from the first matrix part and penetrates into a passage provided in the second matrix part, a third portion of the bracket attached to the first portion of the bracket and forming a central leg.

Then the step (d) of further bending the third portion of bracket 2C may advantageously be achieved in plastically folding said third portion of bracket 2C (the leg(s) 13) from the first portion of bracket 2A toward the second portion of bracket 2B, over the (tubing) subset 3, by means of a punch 27 that emerges from the first matrix part 20 and runs toward the second matrix part 21, preferably through the wall passage 26 provided between the pillars 25, if any, as shown in FIGS. 27 and 28.

The punch 27 is preferably slidingly guided in rectilinear translation, here in the vertical X direction.

The punch 27 (ascending) move can stop when abutting against the bottom of the wall passage 26 of the second matrix part 21, as shown in FIG. 28.

The punch may be made of any suitable rigid material, such as hardened steel, preferably in a form of a parallelepiped having possibly a rounded tip, to help smoothly bending (up) the leg 13.

Manufacturing of the third variant of FIG. 20 may advantageously be achieved in using a fork-shaped second matrix part 21 having two pillars 25 separated by a wall passage 26.

During the closing movement F21 of step (b), the second matrix part 21 solely bends down the second portion of the bracket 2B, and the pillars 25 do not interfere with said second portion of the bracket 2B.

Once the pillars 25 come into abutment against the (upper) surface of the first portion of the bracket 2A, on either sides of the pre-cut central leg 13, thus stopping the closing movement F21 and consequently the bending movement of the second portion of the bracket 2B, then a unique, central punch 27 may fold the central leg 13 upwardly, through the wall passage 26, while the pillars 25 firmly hold the first portion of the bracket 2A.

Conversely, manufacturing the fourth variant of FIG. 29 may be achieved in a similar way, in using a second matrix part 21 with a single central pillar 25 for bending down the second portion of the bracket 2B and a fork-like punch 27 (or two parallel-running punches 27) for bending the lateral legs 13 upwardly.

It is noted that another way of manufacturing ("mixed way") may consist in providing a second matrix part 21 without pillar 25, in using a removable propping core 22 of suitable shape for stopping the second matrix part 21 at a distance of the first matrix part 20 when the forced clamping distance d1 is reached, and then projecting the punch(es) 27 to bend the leg(s) 13 upwardly through corresponding core-passage(s) provided in said propping core 22, pursuant to a male-female arrangement.

Figure 13:
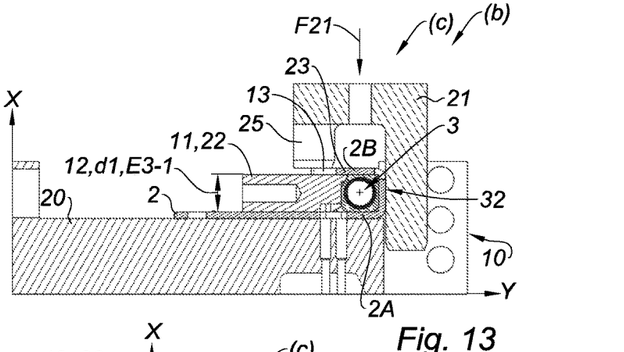

Preferably, as shown in FIG. 7, the second matrix part 21 comprises a U-shaped cavity 30 designed to accommodate the tubing subset 3 and at least partially the bracket 2, said cavity 30 having a bottom wall 31 arranged to bear against the second portion of the bracket 2B for receiving, and possibly bending, said second portion of the bracket toward the first portion of the bracket, a first lateral wall 32 arranged for mating and holding, during the step (b) of plastically deforming the bracket 2, and as shown in FIGS. 13 and 24, a fourth portion of the bracket 2D that connects the first portion 2A of the bracket to the second portion of the bracket 2B, and a second lateral, fork-shaped wall 33 having a two pillars 25 that delimit a wall passage 26 through said second lateral wall 33, said wall passage 26 being suitable both for allowing a propping spacer 11 formed by a propping core 22 to be inserted between the first and second portions 2A, 2B of the bracket without having said propping core 22 interfering with the closing movement F21, and for allowing, in the absence of inserted propping core 22, a punch 27 to emerge from the first matrix part 20 toward the second matrix part 21 for bending (upwardly) the third portion of the bracket 2C toward the second portion of the bracket 2B.

Advantageously, the forming tool 10 is thus very versatile, since various arrangements of bracket and tubing assemblies 1 can be manufactured within the same tool 10, with the same second matrix part 21, said forming tool 10 being suitable both for bending legs 13 downwardly (if attached to the second portion 2B), or upwardly (if attached to first portion 2A).

Figure 1:
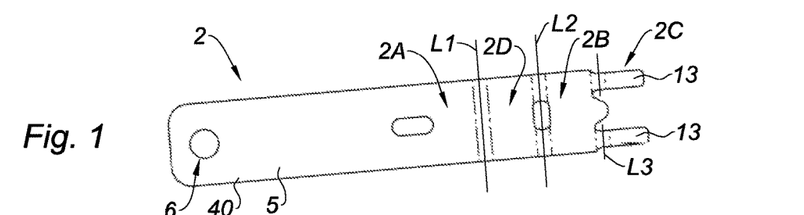
FIG. 1 is a top view of a flat metallic strip used for making a bracket pursuant to the invention.

Preferably, the bracket 2 is made of one piece in a metallic strip 40, as shown in FIGS. 1 and 2.

The metal can be for example mild steel, aluminium alloy, or stainless steel.

The strip 40 may be of any suitable shape (straight, angled, etc.) and dimensions (notably with variable width, e.g. with a larger width in the fastening interface 6 area than in the subset 3 area), notably depending on the shape and size of the subset 3 and the fixing conditions of the bracket and tubing assembly 1 in the intended support (e.g. vehicle engine or chassis).

In a simplified embodiment, said strip 40 may be initially a substantially straight strip, possibly with an overall width which is substantially constant and preferably equal to the width (in Z direction) of the supporting arm 5, as shown in FIGS. 1 and 2.

Preferably, said strip 40 (and thus the first, second, third and fourth portions of the bracket 2A, 2B, 2C, 2D) are between 1 mm and 3 mm thick, to combine plastic deformability with sufficient remaining rigidity.

The thickness may vary depending on the strip material and the size of the tube element 4.

Thus, it has been found that a 1.5 mm thickness in stainless steel is suitable for a 8 mm diameter tube element 4, and a 2 mm thickness in stainless steel is suitable for a 10 mm diameter tube element 4.

The legs 13 and the arresting tabs 23 may be advantageously made by cutting corresponding contours through the thickness of the strip 40.

Naturally, the invention is not limited to the described variants, the skilled person being able to extract one or more of the above mentioned features, to make any combination thereof, and/or to replace any of said features with an equivalent.

More particularly, the invention also encompasses a forming tool as described above, suitable for achieving a manufacturing process of the invention, and a bracket and subset assembly (bracket and tubing assembly) resulting from said manufacturing process.

Particularly, the invention relates to a (finished) bracket and subset assembly 1 comprising a bracket 2 and a subset 3 that is gripped in a securing gap 12, 12' formed by a first portion 2A of said bracket and a second portion of the bracket 2B which are plastically urged one toward the other, said subset 3 comprising on the one hand at least a subset element 4, preferably a tube element 4, and on the other hand at least an elastic pad 7 having a Young modulus that is lower than the Young modulus of the subset element 4, and which is interposed between said subset element 4 and at least one of the first and second portions of the bracket 2A, 2B, within the securing gap 12, 12', and wherein the elastic pad 7 is residually compressed of 1% to 40% in thickness, preferably of 1% to 15% in thickness, by comparison with said elastic pad's thickness E7-0 at rest.

More particularly, the invention relates to such a bracket and subset assembly 1 having a third bracket portion 2C further bent over and against the subset 3, in a secant manner with respect to the first or/and second portion 2A, 2B of the bracket, according to any arrangement described above.

The invention also relates to a (finished) bracket and subset assembly 1 wherein the subset element 4 of the subset 3 has a central axis (Z) and the subset 3 is laterally delimited around said central axis (Z) by four faces, namely a lower face 3A, an upper face 3B opposed to the lower face, a left face 3C, and a right face 3D, wherein the bracket 2 includes a substantially U-shaped recess 14 having a first branch corresponding to the first portion of bracket 2A, a second branch corresponding to the second portion of bracket 2B, and a connecting branch that connects the first branch 2A to the second branch 2B and which corresponds to a fourth portion of bracket 2D, wherein the subset 3 is placed within the U-shaped recess 14 of the bracket so that the lower face of the subset 3A abuts against the first portion of the bracket 2A and the right face of the subset 3D abuts against the fourth portion of the bracket 2D, wherein the second portion of the bracket 2B is plastically bent into abutment against the upper face 3B of the subset, so as to grip the subset 3 between the first and second portions of the bracket 2A, 2B in a first gripping direction (X) which is transverse to the central axis (Z), and wherein a third portion of the bracket 2C, which is attached to the first portion 2A or to the second portion 2B of the bracket, is further bent over the subset 3 and in abutment against the left face of the subset 3C, in a secant manner with respect to the first portion 2A or the second portion 2B of the bracket the said third portion 3C is attached to, thus creating a bend line L3 in the bracket 2, and so as to grip the subset 3 between the third and fourth portions of the bracket 2C, 2D in a second gripping direction (Y) which is transverse to the central axis (Z) and secant to the first gripping direction (X).

The invention also relates to a vehicle and more particularly a motor vehicle, preferably with an internal combustion engine, comprising at least a bracket and subset assembly (bracket and tubing assembly), e.g. used for fixing a tubing circuit to the engine or chassis of said vehicle.

The invention claimed is:

1. A manufacturing process for making a bracket and tubing assembly, said process comprising:
   a step (a) of placing a bracket within a forming tool and putting between a first portion of said bracket and a second portion of said bracket a tubing comprising at least a tubing element and at least an elastic pad having a Young's modulus that is lower than a Young's modulus of the tubing element, and which is interposed between said tubing element and at least one of the first and second portions of the bracket, said tubing having a first, initial thickness at rest,
   a step (b) of actuating the forming tool for plastically deforming the bracket so that the first and second portions of the bracket come closer one to the other and press the tubing, thus compressing the thickness of the tubing element and the elastic pad in a securing gap, and thus gripping said tubing between the said first and second portions of the bracket, said process comprising, during the step (b) of actuating the forming tool for plastically deforming the bracket, a step (c) of stopping the second portion of the bracket at a predetermined forced clamping distance from the first portion of the bracket, thus defining a first configuration of a forced securing gap, wherein the tubing has a second, reduced, intermediate thickness which is lower than the first, initial thickness, and a step (e) of releasing the bracket and tubing assembly from the forming tool, wherein the plastically deformed bracket elastically relaxes so that the second portion of the bracket moves back at a reduced clamping distance from the first portion of the bracket, which is greater than the forced clamping distance, so that a residual securing gap adopts a second configuration wherein the tubing has a third, final thickness, which is greater than the second intermediate thickness, and wherein the forced clamping distance is chosen so that, within the residual securing gap resulting from releasing the bracket and tubing assembly from the forming tool, the final thickness of the tubing is lower than the first, initial thickness thereof, and the elastic pad is residually compressed of 1% to 40% in thickness, by comparison with said elastic pad's thickness at rest, so that the tubing is secured in the residual securing gap by said first and second portions of the bracket without the tubing element being crushed by said first and second portions of the bracket.

2. The process of claim 1 wherein the step (c) of stopping the second portion of the bracket at the predetermined forced clamping distance from the first portion of the bracket is achieved by means of a propping spacer, distinct from the tubing.

3. The process of claim 1, further comprising, once the second portion of the bracket has reached the forced clamping distance from the first portion of the bracket, a step (d) of further plastically bending around and against the tubing, across the securing gap, a third portion of the bracket which is attached to the first portion or to the second portion of the bracket, while the second portion of the bracket is held at the forced clamping distance from the first portion of the bracket.

4. The process of claim 3, wherein the tubing element of the tubing has a central axis and the tubing is laterally delimited around said central axis by four faces, namely a lower face, an upper face opposed to the lower face, a left face, and a right face, in that the bracket is pre-formed prior to step (a) of placing the bracket and the tubing in the forming tool, so that said bracket includes a substantially U-shaped recess having a first branch corresponding to the first portion of the bracket, a second branch corresponding to the second portion of the bracket, and a connecting branch that connects the first branch to the second branch and which corresponds to a fourth portion of the bracket, in that, during step (a) of placing the bracket and the tubing in the forming tool, the tubing is placed within the U-shaped recess of the bracket so that the lower face of the tubing abuts against the first portion of the bracket and the right face of the tubing abuts against the fourth portion of the bracket, in that, during the step (b) of actuating the forming tool for plastically deforming the bracket, the second portion of the bracket is plastically bent toward the first portion of the bracket and thus brought into abutment against the upper face of the tubing, at the forced clamping distance from the first portion of the bracket, so as to grip the tubing between the first and second portions of the bracket in a first gripping direction which is transverse to the central axis, and in that, during the step (d) of further plastically bending a third portion of the bracket, said third portion of the bracket is plastically bent toward the fourth portion of the bracket and brought into abutment against the left face of the tubing, so as to grip the tubing between the third and fourth portions of the bracket, in a second gripping direction which is transverse to the central axis and perpendicular to the first gripping direction.

5. The process according to claim 3 wherein the third portion of the bracket is attached to the second portion of the bracket, and, once the arresting tab and the second portion of the bracket are stopped by the propping core pursuant to step (c), the second matrix part continues the closing movement toward the first matrix part, so as to achieve the step (d) of further bending the third portion of the bracket in plastically folding said third portion of the bracket toward the first portion of the bracket, over the tubing, beyond the propping core.

6. The process according to claim 3, wherein the forming tool comprises a first matrix part for receiving the first portion of the bracket and a second matrix part which is pressed against the first matrix part during the step (b) of actuating the forming tool for plastically deforming the bracket, according to a closing movement which makes the said second matrix part plastically bend the second portion of the bracket toward the first portion of the bracket, until said second portion of the bracket reaches the forced clamping distance from the first portion of the bracket, and wherein the step (c) of stopping the second portion of the bracket at the predetermined forced clamping distance from the first portion of the bracket is achieved by means of a propping spacer, distinct from the tubing, the propping spacer is formed by a propping core that is distinct from the first and second matrix parts, said propping core being inserted between said first and second matrix part prior to the step (b) of actuating the forming tool for plastically deforming the bracket, and the third portion of the bracket is attached to the first portion of the bracket in that once the step (c) of stopping the second portion of the bracket is achieved, the second matrix part and the propping spacer are in a situation of pressing and holding the first portion of the bracket against the first matrix part, and in that the step (d) of further bending the third portion of the bracket is achieved in plastically folding said third portion of the bracket from the first portion of the bracket toward the second portion of the bracket, over the tubing, by means of a punch that emerges from the first matrix part and runs toward the second matrix part.

7. The process according to claim 3, wherein the process is devoid of any step of forcibly connecting and anchoring either the second portion of the bracket or the third portion of the bracket, to the first portion of the bracket over the securing gap and the tubing by screwing, riveting, welding, gluing or hooking.

8. The process according to claim 1, wherein the step (c) of stopping the second portion of the bracket at a predetermined distance from the first portion of the bracket is achieved by means of a propping spacer, distinct from the tubing, and in that the propping spacer is a part of the forming tool, and is removed from the bracket and tubing assembly prior to extracting the bracket and tubing assembly from the forming tool.

9. The process according to claim 1, wherein the forming tool comprises a first matrix part for receiving the first portion of the bracket and a second matrix part which is pressed against the first matrix part during the step (b) of actuating the forming tool for plastically deforming the bracket, according to a closing movement which makes the said second matrix part plastically bend the second portion of the bracket toward the first portion of the bracket, until said second portion of the bracket reaches the forced clamping distance from the first portion of the bracket.

10. The process according to claim 9 wherein the step (c) of stopping the second portion of the bracket at the predetermined forced clamping distance from the first portion of the bracket is achieved by means of a propping spacer, distinct from the tubing, and in that the propping spacer is formed by a propping core that is distinct from the first and second matrix parts, said propping core being inserted between said first and second matrix part prior to the step (b) of actuating the forming tool for plastically deforming the bracket.

11. The process according to claim 10 wherein the second portion of the bracket comprises at least one arresting tab which is arranged to come into abutment against the propping core when the second portion of the bracket reaches the forced clamping distance from the first portion of the bracket.

12. The process according to claim 9 wherein the step (c) of stopping the second portion of the bracket at the predetermined forced clamping distance from the first portion of the bracket is achieved by means of a propping spacer, distinct from the tubing, and which is formed by a pillar of the second matrix part that comes into abutment against the first matrix part and/or against the first portion of the bracket supported by said first matrix part, so as to stop the closing movement of said second matrix part when the second portion of the bracket reaches the forced clamping distance from the first portion of the bracket.

13. The process according to claim 9, wherein the second matrix part comprises a U-shaped cavity designed to accommodate the tubing and at least partially the bracket, said cavity having a bottom wall arranged to bear against the second portion of the bracket for receiving, and bending, said second portion of the bracket toward the first portion of the bracket, a first lateral wall arranged for mating and holding, during the step (b) of plastically deforming the bracket, a fourth portion of the bracket that connects the first portion of the bracket to the second portion of the bracket, and a second lateral, fork-shaped wall having two pillars that delimit a wall passage through said second lateral wall, said wall passage being suitable for allowing a propping spacer formed by a propping core to be inserted between the first and second portions of the bracket without having said propping core interfering with the closing movement, or for allowing, in the absence of said inserted propping core, a punch to emerge from the first matrix part toward the second matrix part for bending the third portion of the bracket toward the second portion of the bracket.

14. The process according to claim 1, wherein the bracket is made of a one piece metallic strip.

15. The process according to claim 1, wherein the elastic pad is formed by an elastomeric sleeve that surrounds the tubing element.

* * * * *